United States Patent
Iwano et al.

(10) Patent No.: US 8,915,532 B2
(45) Date of Patent: Dec. 23, 2014

(54) VEHICLE TRUNK DOOR STRUCTURE

(75) Inventors: Yoshihiro Iwano, Toyota (JP); Kosuke Ebina, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/004,690

(22) PCT Filed: Mar. 23, 2012

(86) PCT No.: PCT/JP2012/057608
§ 371 (c)(1),
(2), (4) Date: Sep. 12, 2013

(87) PCT Pub. No.: WO2012/147435
PCT Pub. Date: Nov. 1, 2012

(65) Prior Publication Data
US 2014/0041306 A1    Feb. 13, 2014

(30) Foreign Application Priority Data
Apr. 28, 2011   (JP) ................................ 2011-102303

(51) Int. Cl.
*B62D 25/10*   (2006.01)

(52) U.S. Cl.
CPC .................... *B62D 25/105* (2013.01)
USPC ..................... 296/76; 296/146.5; 296/181.01; 296/203.04; 296/56

(58) Field of Classification Search
USPC ......... 296/146.5, 76, 181.01, 187.01, 203.01, 296/203.04, 56
See application file for complete search history.

(56) References Cited

U.S. PATENT DOCUMENTS

| | | | | |
|---|---|---|---|---|
| 6,053,562 A * | 4/2000 | Bednarski | ................ | 296/146.5 |
| 6,692,057 B2 * | 2/2004 | Igarashi et al. | ................ | 296/76 |
| 7,597,378 B2 * | 10/2009 | Ichinose et al. | ................ | 296/76 |
| 7,914,066 B2 * | 3/2011 | Miyake et al. | ............ | 296/146.6 |
| 8,226,151 B2 * | 7/2012 | Miyake et al. | ............ | 296/146.8 |
| 8,567,841 B2 * | 10/2013 | Ginestet et al. | ................ | 296/56 |
| 8,622,458 B2 * | 1/2014 | Hache | ........................ | 296/146.8 |
| 8,690,220 B2 * | 4/2014 | Tsukiyama et al. | ............ | 296/56 |
| 2009/0026793 A1 | 1/2009 | Ichinose et al. | | |
| 2012/0306231 A1 * | 12/2012 | Ginestet et al. | ................ | 296/76 |
| 2013/0229026 A1 * | 9/2013 | Thorpe et al. | ................... | 296/76 |

FOREIGN PATENT DOCUMENTS

| | | |
|---|---|---|
| JP | S-62-248611 | 10/1987 |
| JP | U-3-121184 | 12/1991 |
| JP | U-6-16177 | 3/1994 |
| JP | A-7-267147 | 10/1995 |
| JP | H-10-100797 | 4/1998 |
| JP | A-2000-071842 | 3/2000 |
| JP | A-2001-277271 | 10/2001 |
| JP | A-2003-511178 | 3/2003 |
| JP | A-2004-262038 | 9/2004 |
| JP | A-2009-29290 | 2/2009 |
| WO | WO 01/28381 A1 | 4/2001 |

\* cited by examiner

*Primary Examiner* — Jerry Redman
(74) *Attorney, Agent, or Firm* — Oliff PLC

(57) ABSTRACT

Deformation of a trunk door is suppressed with a simple structure. A lateral bead is formed along a ridgeline region that is formed by an inner upper wall portion and an inner rear wall portion of an inner panel of the trunk door. The lateral bead is not connected to a ring bead formed at an outer periphery of the inner panel. Thus, stiffness of the ridgeline region may be suppressed compared with a case in which the lateral bead is connected to the ring bead. Thus, substantial V-form folding of an outer upper wall portion and an outer rear wall portion may be suppressed.

4 Claims, 12 Drawing Sheets

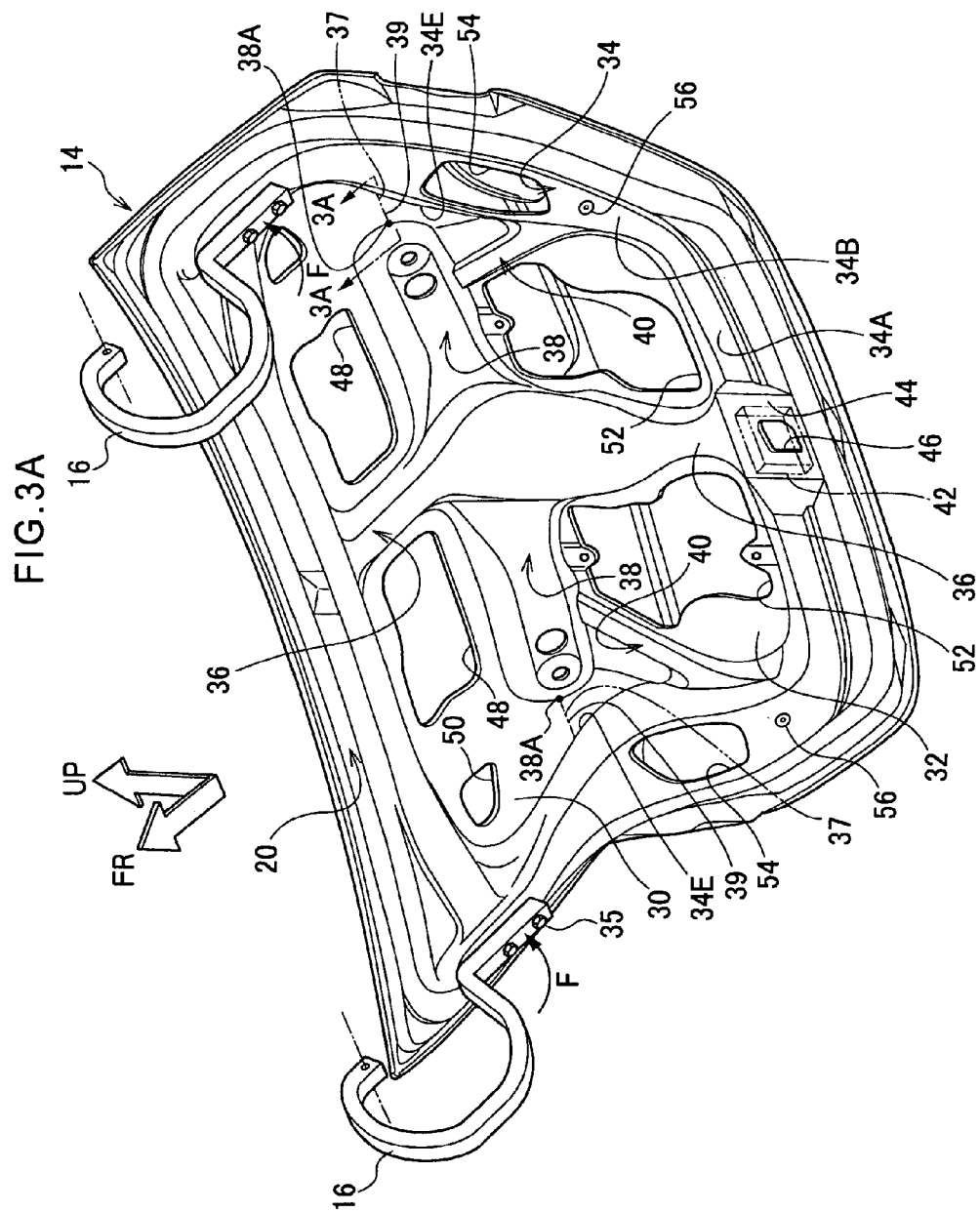

VEHICLE TRUNK DOOR STRUCTURE

TECHNICAL FIELD

The present invention relates to a trunk door structure for a vehicle.

BACKGROUND ART

As a trunk door that covers the opening of a luggage compartment, a trunk door is known (for example, see Patent Document 1) that is integrally provided with an upper wall portion, which extends substantially horizontally in a vehicle front-and-rear direction from a rear end vicinity of a rear window, and a rear wall portion, which extends in the vehicle downward direction from a vehicle rear end of the upper wall portion, and that appears as a substantial "L" shape in side view.

In this kind of trunk door, vehicle forward side portions at both sides in the vehicle width direction are supported at the vehicle body via door hinges. A locking mechanism that can retain the trunk door in a closed state is provided at the vehicle body, at a vehicle width direction middle portion of a vehicle rearward lower edge of the luggage compartment opening.

Patent Document 1: Japanese Patent Application Laid-Open (JP-A) No. H7-267147

DISCLOSURE OF INVENTION

Technical Problem

In the state in which the trunk door is closed by the locking mechanism, a force that urges the trunk door in the opening direction acts on the trunk door from the hinges, and a reaction force acts at weatherstripping, which is a resilient body. Consequently, the trunk door may be subject to bending to a substantial "V" form in a vehicle side view (in the side view, an angle formed between the upper wall portion and the rear wall portion is decreased and a corner portion of the trunk door deforms to protrude beyond the vehicle main body). In order to suppress this deformation, measures such as increasing a plate thickness of the trunk door, adding reinforcing members and the like have been considered. However, these measures increase the numbers and/or weights of members, and there is scope for improvement.

In consideration of the situation described above, an object of the present invention is to provide a vehicle trunk door structure in which deformation of the trunk door may be suppressed with a simple structure.

Solution To Problem

A vehicle trunk door structure according to a first aspect of the present invention includes: a trunk door structured with an outer panel and an inner panel, the trunk door including an upper wall portion that extends in a vehicle front-and-rear direction and a rear wall portion that extends in a vehicle downward direction from the vehicle front-and-rear direction rear end of the upper wall portion, and the trunk door being provided to be capable of opening and closing an opening of a luggage compartment of the vehicle, due to the vehicle forward side of the upper wall portion being supported at a vehicle main body via a hinge; an urging member connected to each of two vehicle width direction sides of the vehicle forward side of the trunk door, the urging member urging the trunk door in an opening direction; a locking mechanism that anchors a vehicle width direction middle portion of a vehicle rearward lower edge of the trunk door at the vehicle body; a ring bead that is formed at the inner panel and forms a circuit round an outer periphery of the inner panel; a longitudinal bead that is formed at the inner panel and extends in the vehicle front-and-rear direction at a vehicle width direction middle portion, each of two end portions of the longitudinal bead connecting to the ring bead; and a lateral bead that is provided along a ridgeline region between the upper wall portion and the rear wall portion, the lateral bead extending from the longitudinal bead toward each vehicle width direction outer side, and each vehicle width direction outer side end portion of the lateral bead being disposed at a position that is separated from the ring bead.

Now, operation of the vehicle trunk door structure according to the first aspect is described.

The trunk door is provided with the upper wall portion that extends in the vehicle front-and-rear direction and the rear wall portion that extends in the vehicle downward direction from the vehicle front-and-rear direction rear end of the upper wall portion. The trunk door is supported at the vehicle main body via the hinges, and can open and close the opening of the luggage compartment.

The locking mechanism may anchor the vehicle width direction middle portion of the vehicle rearward lower edge of the trunk door and keep the trunk door in a closed state.

The urging member urges the trunk door in the opening direction. Thus, when the anchoring of the trunk door by the locking mechanism is released, the trunk door may be opened easily.

Because the urging force of the urging member acts on the trunk door that is being kept in the closed state by the locking mechanism, the urging force acts to cause the trunk door to deform by bending about the ridgeline region between the upper wall portion and the rear wall portion (hereinafter referred to where appropriate as "substantial V-form folding"). When a reaction force from weatherstripping acts on the trunk door, this too promotes the substantial V-form folding.

The present inventors have established by various empirical investigations that the substantial V-form folding tends to occur when stiffness is high over the whole length of the ridgeline portion, that is, when a bead is formed along the whole of the ridgeline region, and that the substantial V-form folding may be suppressed by suppressing a degree of stiffness of the ridgeline region.

In the vehicle trunk door structure according to the first aspect, the lateral bead along the ridgeline region is formed at the inner panel, but the lateral bead is not connected to the ring bead that forms a circuit round the outer periphery of the inner panel. Thus, the degree of stiffness of the ridgeline region is suppressed, and substantial V-form folding may be suppressed compared to a case in which a lateral bead is connected to a ring bead.

In a vehicle trunk door structure according to a second aspect, in the vehicle trunk door structure according to the first aspect, the lateral bead and a portion of the ring bead other than a portion that intersects with a line of extension of the lateral bead are connected by an auxiliary bead.

The urging force of the urging member that acts on the two vehicle width direction side portions of the vehicle forward side of the trunk door, which is being kept in the closed state by the locking mechanism anchoring the vehicle width direction middle of the vehicle rearward lower side, is a force that twists the trunk door.

According to the vehicle trunk door structure in accordance with the second aspect, the ring bead at the vehicle lower portion relative to the ridgeline region is connected to the lateral bead by the auxiliary bead. Thus, three beads—the portion of the ring bead, the lateral bead and the auxiliary bead—are connected to one another and a new ring portion is formed by these three beads within the inner panel. Consequently, twisting deformation of the trunk door may be suppressed, and substantial V-form folding of the trunk door may be further suppressed.

The auxiliary bead does not connect on a line of extension of the lateral bead inside the ring bead, because this is a direction that would promote substantial V-form folding.

In a vehicle trunk door structure according to a third aspect, in the vehicle trunk door structure according to the second aspect, an end portion of the auxiliary bead at the ring bead side thereof is connected to a corner portion that is formed by a vehicle rearward lower edge portion and a vehicle width direction longitudinal edge portion of the ring bead.

The end portion at the ring bead end of the auxiliary bead is connected to the corner portion formed between the vehicle rearward lower edge portion and the vehicle width direction longitudinal edge portion of the ring bead. Thus, these three beads are connected at a single location and stiffness is improved.

In a vehicle trunk door structure according to a fourth aspect, in the vehicle trunk door structure according to the second aspect, an end portion of the auxiliary bead at the ring bead side thereof is connected to a vehicle rearward lower edge portion of the ring bead, and the auxiliary bead is formed to be perpendicular to the vehicle rearward lower edge portion of the ring bead.

The end portion at the ring bead end of the auxiliary bead is connected to the vehicle rearward lower edge portion of the ring bead, and the auxiliary bead is formed to be orthogonal with respect to the vehicle rearward lower edge portion of the ring bead. Thus, stiffness in the longitudinal direction is improved.

Advantageous Effects of Invention

According to the vehicle trunk door structure of the present invention as described hereabove, by beads being formed at suitable positions, deformation of the trunk door may be effectively suppressed without the addition of a reinforcing member or an increase in plate thickness.

BRIEF DESCRIPTION OF DRAWINGS

FIG. 3A is a perspective diagram of a trunk door inner panel.

BEST MODE FOR CARRYING OUT THE INVENTION

Herebelow, an exemplary embodiment of the vehicle trunk door structure according to the present invention is described using FIG. 1 to FIG. 9.

Figure 1:
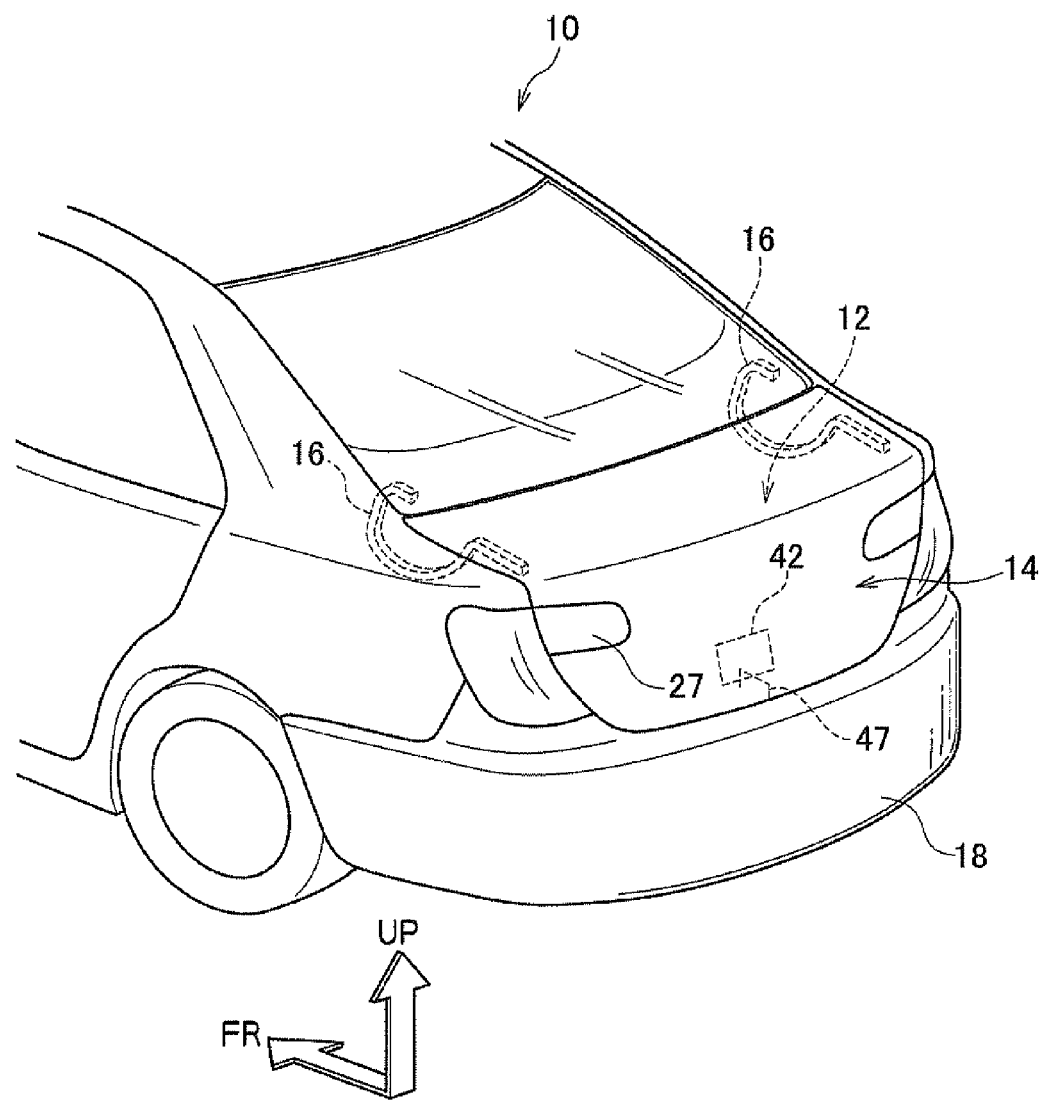
FIG. 1 is a perspective diagram showing a rear portion of a vehicle.

As shown in FIG. 1, a vehicle 10 according to the present exemplary embodiment is, as an example, a sedan-type car, and is equipped with a luggage compartment 12 at a vehicle rearward side of the vehicle cabin.

A trunk door 14 that closes off an opening of the luggage compartment 12 appears as a substantial "L" shape in side view, is attached to the vehicle 10 via door hinges 16, and is provided so as to open from an upper edge of a rear bumper 18.

Opening/Closing Mechanism of the Trunk Door

Figure 10:
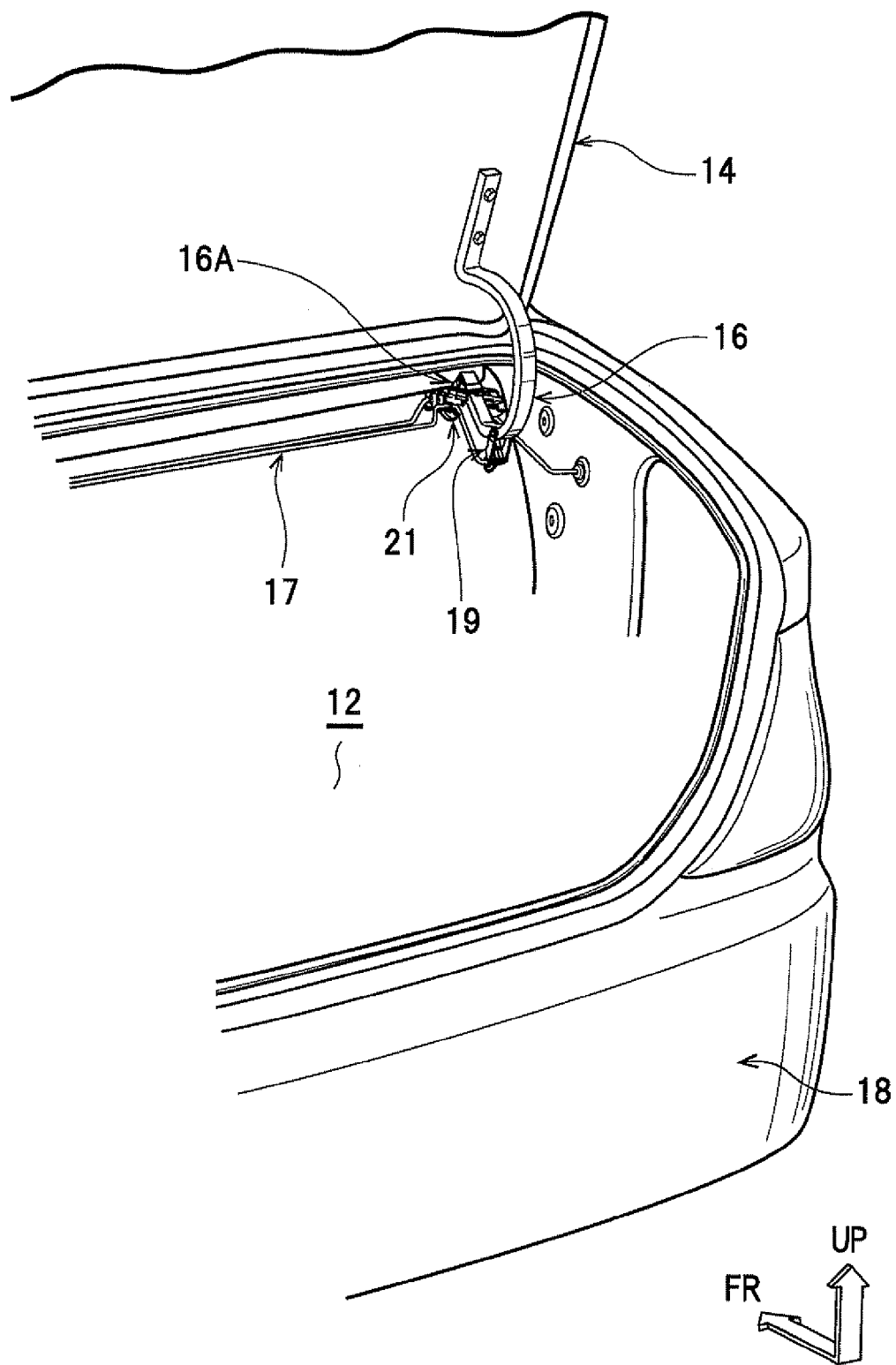
FIG. 10 is a perspective view showing an opening/closing mechanism of the trunk door.

FIG. 10 shows an opening/closing mechanism of the trunk door 14. As shown in FIG. 10, one end side of each door hinge 16 is turnably joined to a hinge pin (not shown in the drawings) of a hinge support 16A, which is described below, provided at the vehicle 10, and the other end side of the door hinge 16 is fixed by bolts to one of two vehicle width direction side portions at the vehicle forward side of the trunk door 14 (more specifically, an inner panel 20, which is described below (not shown in FIG. 10)).

The opening/closing mechanism of the trunk door 14 is equipped with the trunk door 14, the door hinges 16, and the pair of left and right hinge supports 16A. The trunk door 14 is deployed to be capable of opening and closing between the luggage compartment 12 and making the vehicle cabin separate from the outer side of the vehicle cabin. The door hinges 16 support the trunk door 14, and the hinge supports 16A link the door hinges 16 with the vehicle body.

The opening/closing mechanism of the trunk door 14 is also equipped with a trunk door hinge torsion bar 17 and hinge links 19. The trunk door hinge torsion bar 17 acts as an urging member that urges the trunk door 14 in the opening direction (the direction of turning upward) with a torsional force. The hinge links 19 are for transmitting the torsional force to the door hinges 16.

The opening/closing mechanism of the trunk door 14 is further equipped with a bracket 21 that axially supports the trunk door hinge torsion bar 17. In the present exemplary embodiment, the components mentioned above are the principal elements structuring the opening/closing mechanism of the trunk door 14.

Accordingly, the trunk door 14 turns about the hinge pins of the door hinges 16 and is movable between a closed position at which the opening of the luggage compartment 12 is closed (the state in FIG. 1) and an open position at which the opening of the luggage compartment 12 is opened (the state in FIG. 10).

Figure 2:
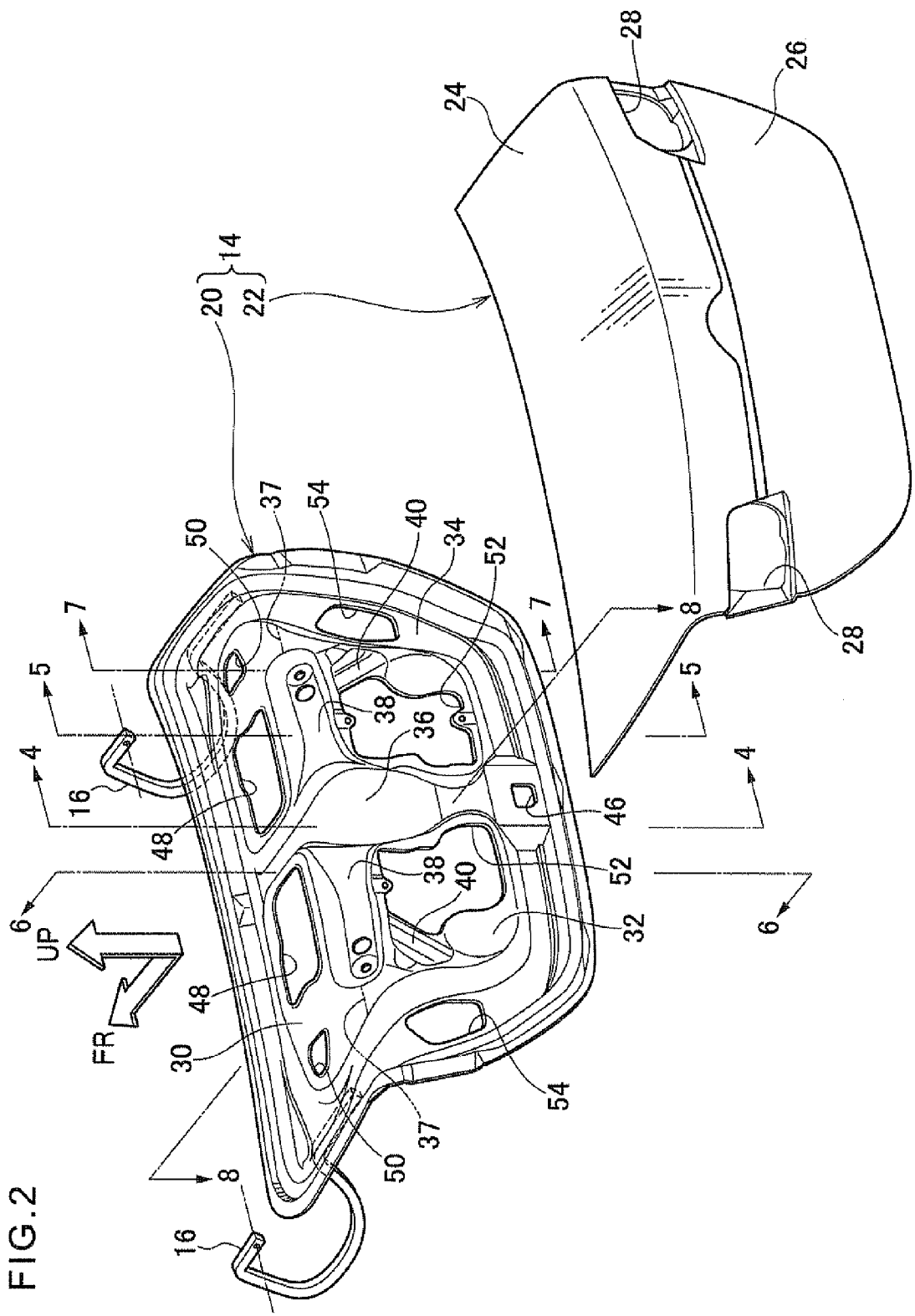
FIG. 2 is an exploded perspective diagram of a trunk door.

As shown in FIG. 2 and FIG. 3, the trunk door 14 according to the present exemplary embodiment is a structure that is structured by the inner panel 20 and an outer panel 22 being superposed and joined (for example, joined by outer periphery portions being hemmed or the like, or alternatively joined by spot welding or the like). The inner panel 20 is pressed from a single metal plate of steel or the like, and the outer panel 22 is similarly pressed from a single metal plate of steel or the like.

The outer panel 22 is provided with an outer upper wall portion 24 and an outer rear wall portion 26. The outer upper wall portion 24 is disposed at the vehicle upward side of the luggage compartment 12. The outer rear wall portion 26 is disposed at the vehicle rearward side of the luggage compartment 12, and extends to the vehicle downward side, toward the rear bumper 18, from a vehicle rearward side end portion of the outer upper wall portion 24.

At each of the left and right sides of the outer rear wall portion 26, an aperture 28 at which a tail lamp 27 (see FIG. 1) is to be mounted is formed.

The inner panel 20 is provided with an inner upper wall portion 30 and an inner rear wall portion 32. The inner upper wall portion 30 is provided so as to oppose the outer upper wall portion 24 and is disposed at the vehicle upward side of the luggage compartment 12. The inner rear wall portion 32 provided so as to oppose the outer rear wall portion 26, is disposed at the vehicle rearward side of the luggage compartment 12, and extends toward the rear bumper 18 from a vehicle rearward side end portion of the inner upper wall portion 30.

A ring bead 34 is formed in a recessed shape in cross section (that is, a shape protruding toward the inner side of the luggage compartment), forming a circuit round an outer periphery of the inner panel 20. The other end portions of the door hinges 16 are fixed to the ring bead 34 formed at the inner upper wall portion 30 with bolts 35, at portions extending in the vehicle front-and-rear direction at each of the two vehicle width direction sides.

A longitudinal bead 36 is formed, in a recessed shape in cross section (that is, a shape protruding toward the inner side of the luggage compartment), extending in the vehicle front-and-rear direction at a vehicle width direction middle portion of the inner panel 20.

A lateral bead 38 in a recessed shape in cross section (that is, a shape protruding toward the inner side of the luggage compartment) is formed along a ridgeline region 37 that is formed by the inner upper wall portion 30 and the inner rear wall portion 32. The cross-sectional recessed shape lateral bead 38 intersects and is connected to the longitudinal bead 36, but is not connected to the cross-sectional recessed shape ring bead 34.

Figure 3B:
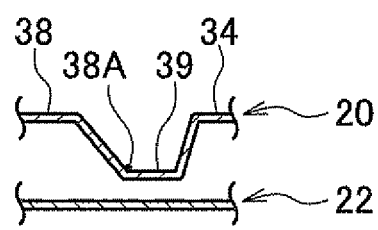
FIG. 3B is a linear sectional diagram cut along 3A-3A of FIG. 3A.
Figure 4:
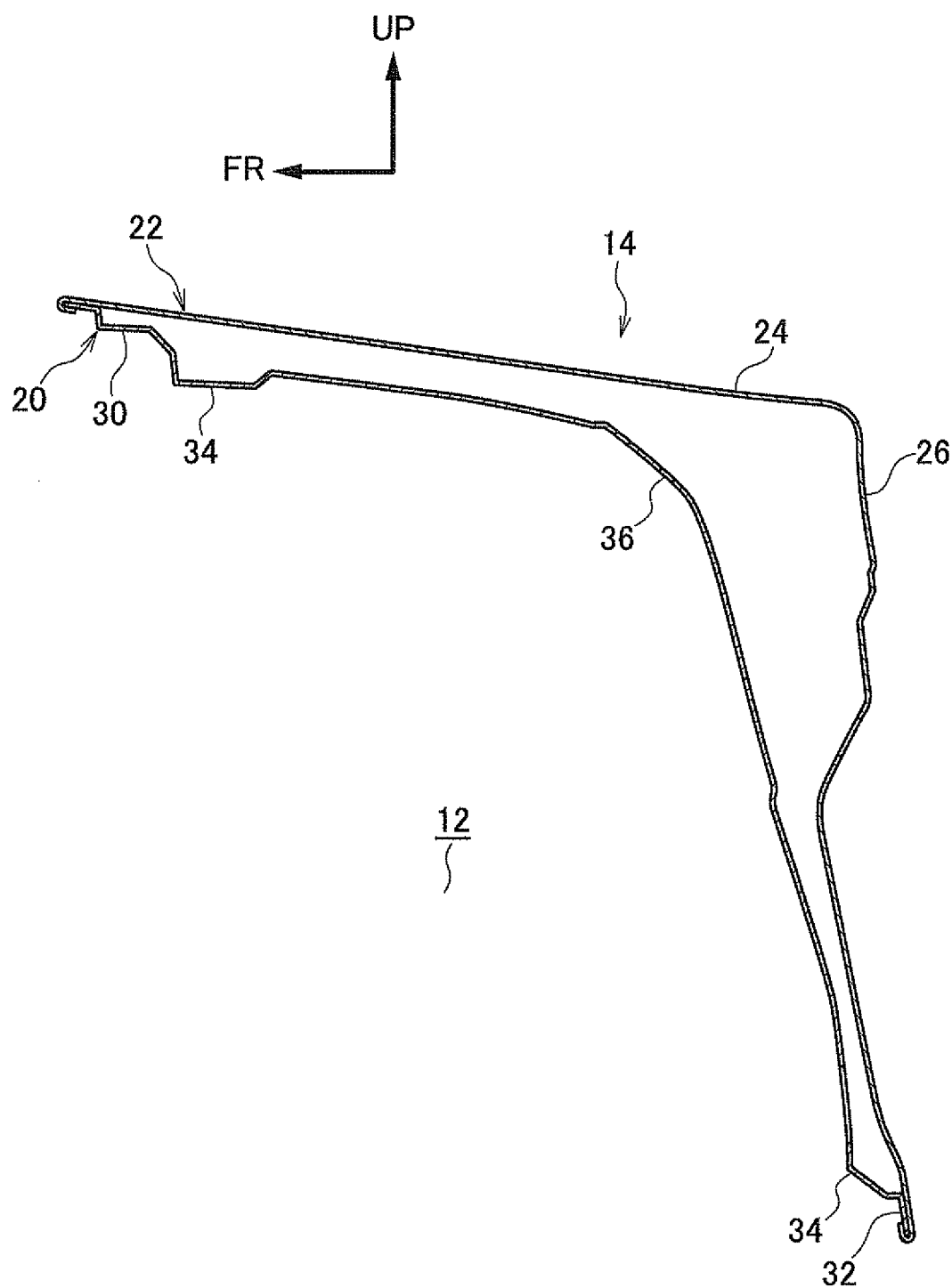
FIG. 4 is a linear sectional diagram of the trunk door shown in FIG. 2, cut along 4-4.

As shown in FIG. 3A and FIG. 3B, a lateral direction end portion 38A of the lateral bead 38 is separated from an inner periphery side edge portion 34E of the ring bead 34. Thus, the lateral bead 38 and the ring bead 34 are not connected to one another as bead portions (but connected to one another via a flat region 39 (a valley portion) that is distinct from the portions with recessed shapes in cross section).

Auxiliary beads 40, each with a recessed shape in cross section (that is, a shape protruding toward the inner side of the luggage compartment), are formed at the inner panel 20, connecting the lateral bead 38 with the ring bead 34.

One end of each auxiliary bead 40 connects to the lateral bead 38, between the region of intersection of the lateral bead 38 with the longitudinal bead 36 and the end portion of the lateral bead 38 at the opposite side from the longitudinal bead side thereof.

The auxiliary beads 40 connected to the lateral bead 38 extend toward the ring bead 34 at regions of connection between a vehicle rearward lower edge portion 34A that extends in the vehicle width direction (horizontally) and vehicle width direction longitudinal edge portions 34B that extend in the vehicle upward direction from each of two end portions of the vehicle rearward lower edge portion 34A. Each auxiliary bead 40 according to the present exemplary embodiment is angled with respect to the vehicle rearward lower edge portion 34A in an elevation view from the vehicle rearward side.

Portions of the inner panel 20 other than the ring bead 34, longitudinal bead 36, lateral bead 38 and auxiliary bead 40 formed in recessed shapes in cross section are provided to be close to the outer panel 22 and substantially parallel with the outer panel 22.

A lock assembly mounting portion 44 is formed at the lower end side (at the ring bead 34) of the vehicle width direction middle of the inner rear wall portion 32 of the inner panel 20. A lock assembly 42 for fixing the trunk door 14 in the closed state is mounted at the lock assembly mounting portion 44. A hole for wiring 46 is formed in the lock assembly mounting portion 44.

Cutaway holes 48 and cutaway holes 50 are formed in the inner upper wall portion 30 of the inner panel 20 at both sides of the longitudinal bead 36, and cutaway holes 52 and cutaway holes 54 are formed in the inner rear wall portion 32 at both sides of the longitudinal bead 36.

The cutaway holes 52 and the like are used as portions for mounting electronic components of the trunk door 14 (for example, components relating to a smart key). The cutaway holes 54 are formed to oppose the apertures 28 at which the tail lamps 27 are to be mounted (not shown in FIG. 3).

As shown in FIG. 1, a striker 47 is mounted at the vehicle 10, at a vehicle width direction middle portion of the vehicle rearward side of the opening of the luggage compartment 12. The striker 47 engages with the lock assembly 42 of the trunk door 14. A locking mechanism is constituted by the lock assembly 42 and the striker 47.

A fitting stopper mounting portion 56 is provided at each of the corner portions of the ring bead 34 (on a line of extension of the auxiliary bead 40). The fitting stopper mounting portion 56 is for mounting a fitting stopper (not shown in the drawings) that acts as a stopper when the trunk door 14 is being closed.

—Operation—

Now, operation of the vehicle 10 according to the present exemplary embodiment is described.

The trunk door 14 is supported at the main body of the vehicle via the door hinges 16. The trunk door 14 is capable of opening and closing the opening of the luggage compartment 12. The trunk door 14 can be kept in the closed state by the lock assembly 42 being engaged with the striker 47.

In this vehicle 10, weatherstripping is mounted along the opening of the luggage compartment 12, such that rainwater will not enter into the luggage compartment 12. The weatherstripping is formed of a resilient body such that area contact is made with inner faces of the trunk door 14.

An urging force in the direction of opening of the trunk door 14 acts on the door hinges 16 from the trunk door hinge torsion bar 17. Consequently, when the engagement between the lock assembly 42 and the striker 47 is released, the trunk door 14 may be opened with ease.

In the trunk door 14 according to the present exemplary embodiment, the lateral bead 38 formed along the ridgeline region 37 that is formed by the inner upper wall portion 30 and inner rear wall portion 32 of the inner panel 20 (see FIG. 5) is not connected to the ring bead 34 that is formed at the outer periphery of the inner panel 20. Therefore, a degree of stiffness of the ridgeline region 37 may be suppressed compared to a case in which the lateral bead 38 is connected to the ring bead 34. Thus, in the state in which the middle region of the vehicle rearward lower side of the trunk door 14 is fixed by the lock assembly 42 and the striker 47, a deformation as shown by the two-dot chain lines in FIG. 9 such that the angle formed between the outer upper wall portion 24 and the outer rear wall portion 26 at the vehicle width direction side portions becomes smaller, which is referred to as substantial V-form folding, which occurs when an upward turning force F from the door hinges 16 acts on the ring bead 34 at the vehicle forward side at both vehicle width direction sides and a reaction force from the weatherstripping acts, may be suppressed, Further, in the trunk door 14 according to the present exemplary embodiment, the auxiliary beads 40 are provided that each extends from partway along the lateral bead 38 of the inner panel 20 (a portion between the portion of intersection between the longitudinal bead 36 and the longitudinal bead 36 and a vehicle width direction outer side end portion of the lateral bead 38) toward the portion of connection between the vehicle rearward lower edge portion 34A and the vehicle width direction longitudinal edge portion 34B of the ring bead 34, which is to say the corner portion of the ring bead 34, that is, extends at an angle with respect to the ring bead 34, and connects the lateral bead 38 with the ring bead 34. That is, viewing the trunk door 14 from rearward of the vehicle, the auxiliary bead 40 is formed at an angle such that the upper end is at the lateral bead 34 side and the lower end is at the vehicle width direction longitudinal edge portion 34B side of the ring bead 34.

Thus, twisting of the trunk door 14 on which the above-mentioned turning force F acts may be suppressed, and the above-mentioned substantial V-form folding may be further suppressed.

In the present exemplary embodiment, deformation of the trunk door 14 may be suppressed just by optimizing the arrangement of beads, without adding reinforcing members, increasing plate thickness or the like. Thus, the weight of the vehicle need not be increased, and weight may be reduced and costs may be lowered.

Other Exemplary Embodiments

The vehicle 10 according to the exemplary embodiment described above has a structure in which the trunk door 14 is urged in the opening direction by the trunk door hinge torsion bar 17 with the door hinges 16. However, the door hinges 16 may function just as hinges that simply open and close, and the trunk door hinge torsion bar 17 that urges the trunk door 14 in the opening direction may be linked to portions of the trunk door 14 other than the portions at which the door hinges 16 are mounted.

Instead of the trunk door hinge torsion bar 17, an urging member such as a metal spring, a gas spring or the like may be used.

The form of the door hinges 16 in the present exemplary embodiment is an example. The door hinges 16 according to the present exemplary embodiment may be replaced with door hinges of other conventionally known forms.

Figure 5:
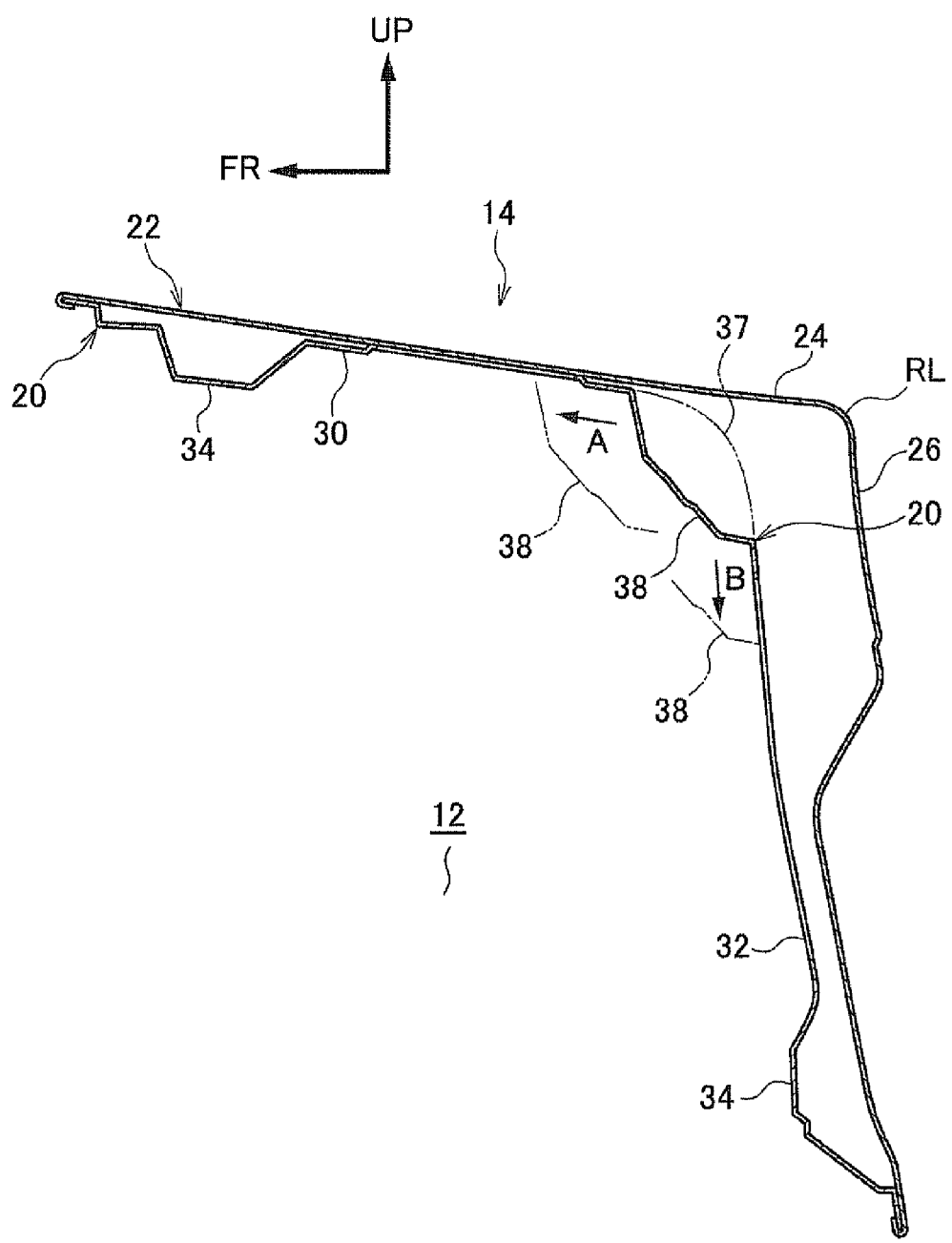
FIG. 5 is a linear sectional diagram of the trunk door shown in FIG. 2, cut along 5-5.
Figure 6:
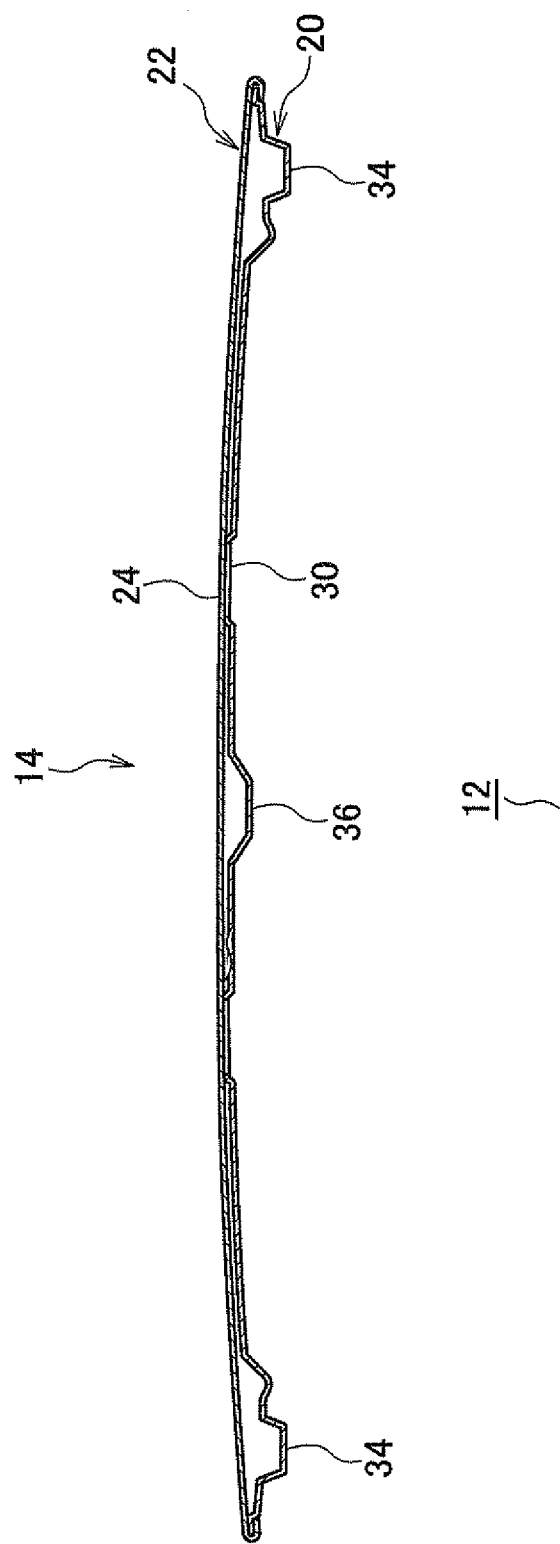
FIG. 6 is a linear sectional diagram of the trunk door shown in FIG. 2, cut along 6-6.
Figure 7:
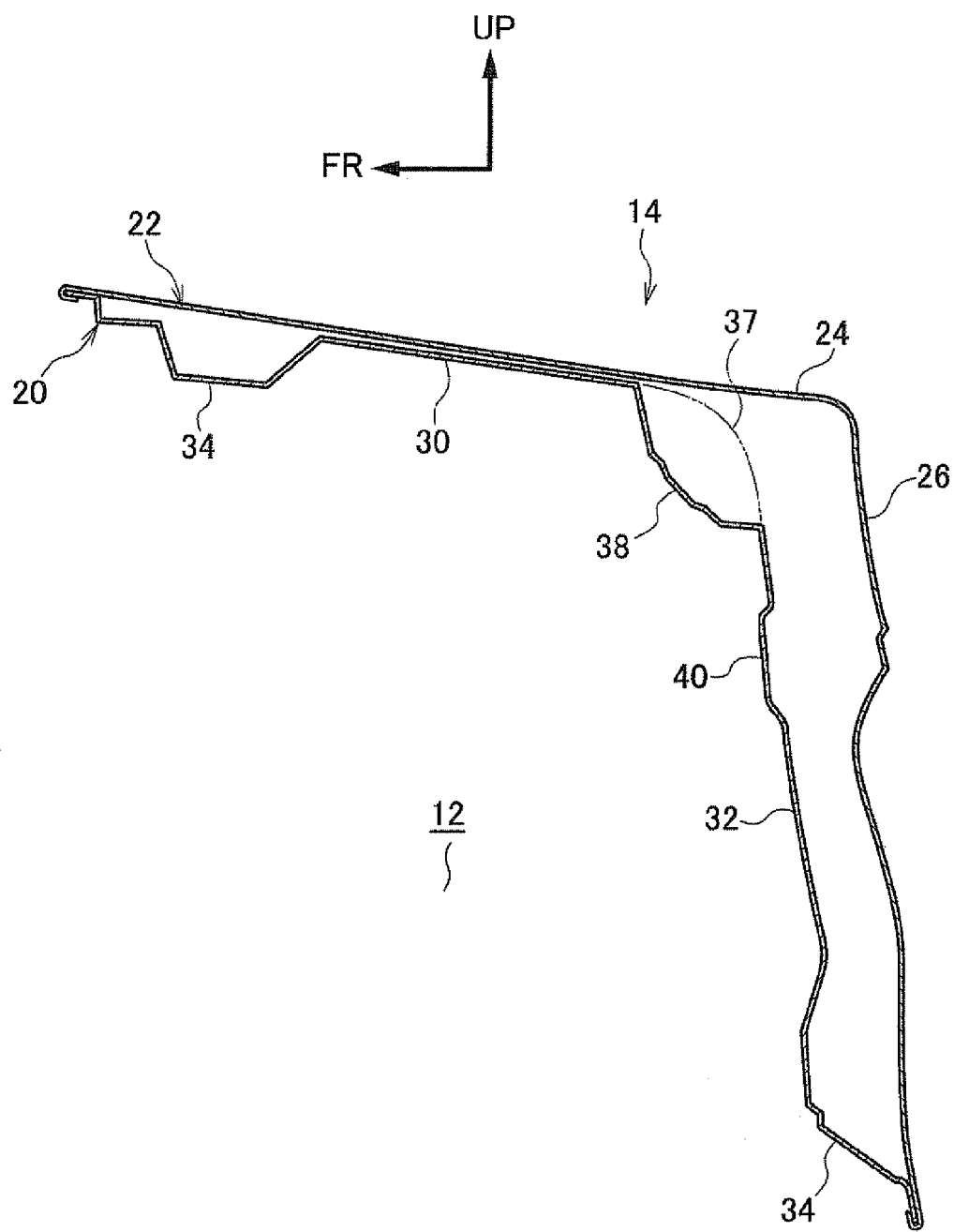
FIG. 7 is a linear sectional diagram of the trunk door shown in FIG. 2, cut along 7-7.
Figure 8:
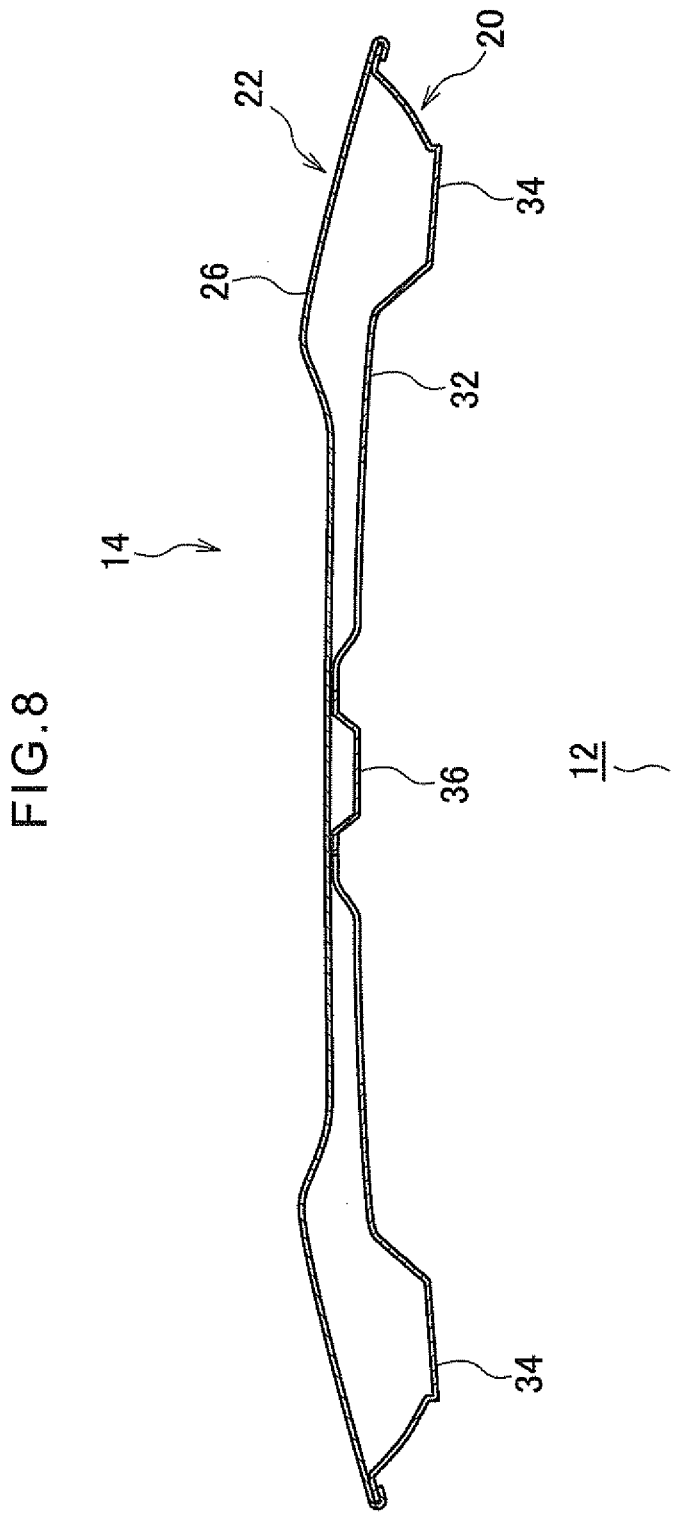
FIG. 8 is a linear sectional diagram of the trunk door shown in FIG. 2, cut along 8-8.
Figure 9:
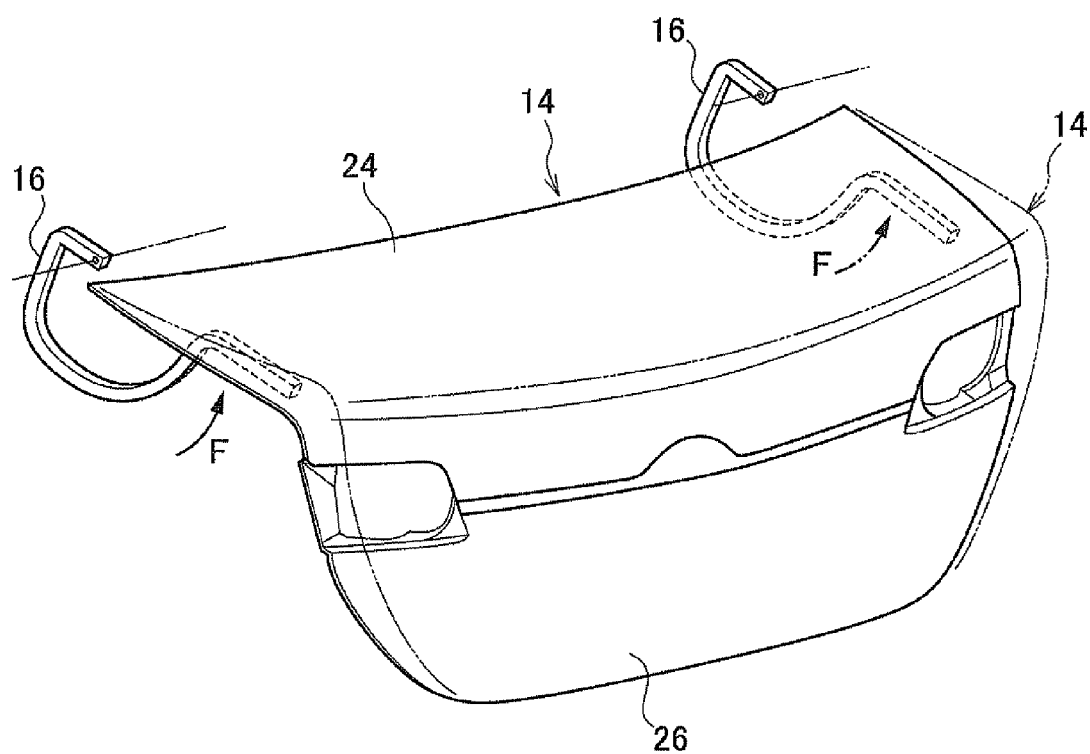
FIG. 9 is a perspective view showing a deformed state of the trunk door.

Positions of the lateral bead 38 at the trunk door 14 are not limited to the positions shown in FIG. 5. The lateral bead 38 may be shifted to the vehicle forward side (for example, the position shown by the two-dot chain line) or the vehicle downward side (for example, the position shown by the one-dot chain line).

Figure 11:
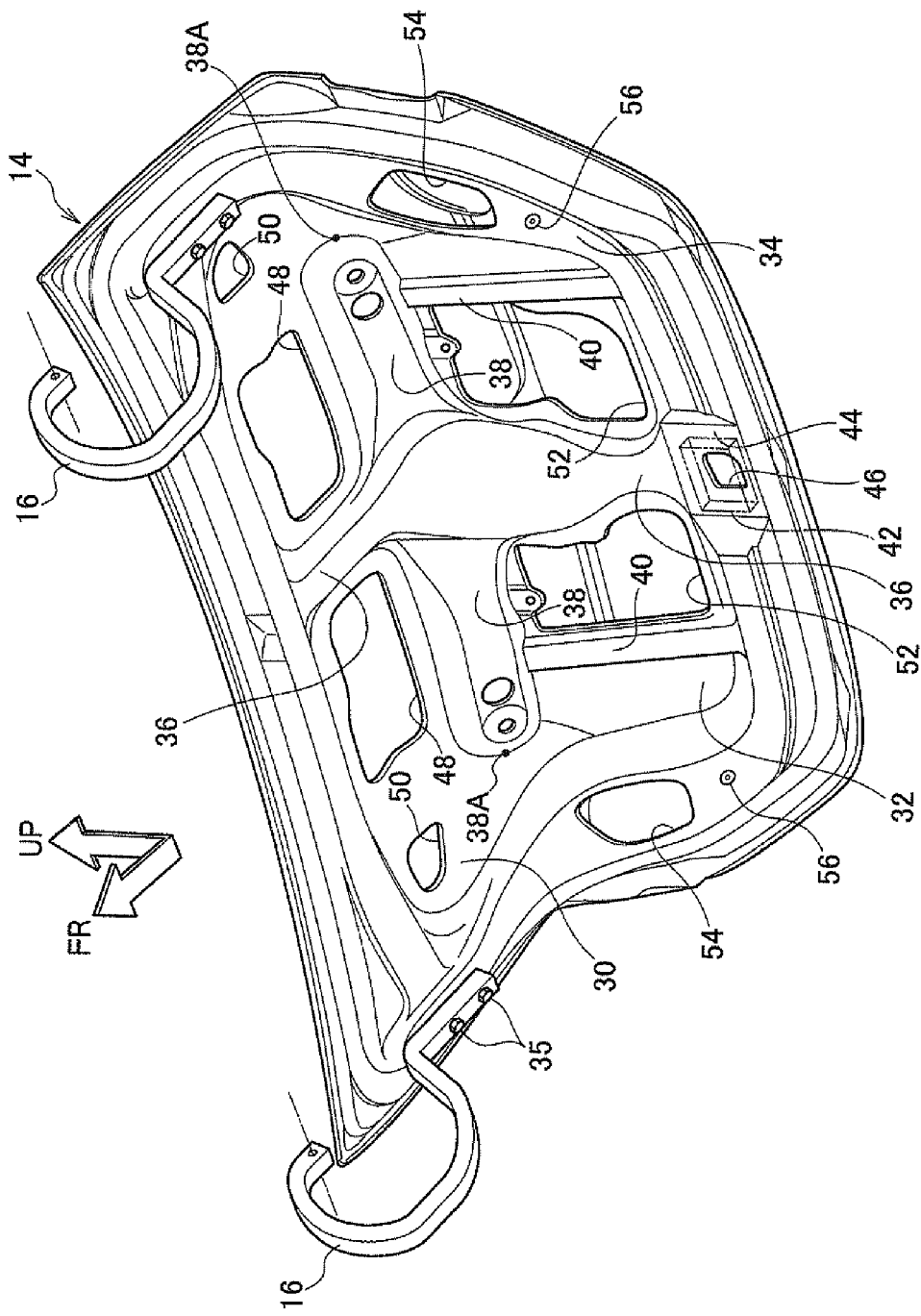
FIG. 11 is a perspective diagram of an inner panel in accordance with another exemplary embodiment.

In the trunk door 14 according to the present exemplary embodiment, each auxiliary bead 40 is angled with respect to the vehicle rearward lower edge portion 34A of the ring bead 34. However, as shown in FIG. 11, the auxiliary bead 40 may be formed to be perpendicular to the vehicle rearward lower edge portion 34A of the ring bead 34. Accordingly, stiffness in the longitudinal direction is improved. Although not shown in the drawings, the auxiliary bead 40 may also be angled in the opposite direction from that shown in FIG. 2 and FIG. 3.

A position of connection of the auxiliary bead 40 at the lateral bead 38 is not limited to the position shown in the example in FIG. 3. The position of connection may be moved closer to the longitudinal bead 36 side than the position shown in FIG. 3, and may be moved closer to the lateral direction end portion 38A side than the position shown in FIG. 3.

In the trunk door 14 according to the present exemplary embodiment, the auxiliary beads 40 are formed at the inner rear wall portion 32, but the present invention is not limited thus. The auxiliary beads 40 may be formed at the inner upper wall portion 30.

Nevertheless, one end of each auxiliary bead 40 must be connected to some portion of the lateral bead 38 and the other end of the auxiliary bead 40 must be connected to a portion other than a portion at which a line of extension of the lateral bead 38 intersects with the ring bead 34. Further, the shape of the auxiliary bead 40 is arbitrary; it may extend in a linear shape and it may extend in a curved shape.

In the trunk door 14 according to the exemplary embodiment described above, the auxiliary beads 40 are formed at the inner panel 20. However, the auxiliary beads 40 need not necessarily be formed, provided substantial V-form folding may be suppressed.

Hereabove, exemplary embodiments of the vehicle luggage door structure of the present invention have been described. The present invention is not limited by these descriptions, and it will be clear that numerous modifications outside of these descriptions may be embodied within a technical scope not departing from the spirit of the invention.

The invention claimed is:

1. A vehicle trunk door structure comprising:
    a trunk door structured with an outer panel and an inner panel, the trunk door including an upper wall portion that extends in a vehicle front-and-rear direction and a rear wall portion that extends in a vehicle downward direction from the vehicle front-and-rear direction rear end of the upper wall portion, and the trunk door being provided to be capable of opening and closing an opening of a luggage compartment of the vehicle, due to the vehicle forward side of the upper wall portion being supported at a vehicle main body via a hinge;
    an urging member connected to each of two vehicle width direction sides of the vehicle forward side of the trunk door, the urging member urging the trunk door in an opening direction;
    a locking mechanism that anchors a vehicle width direction middle portion of a vehicle rearward lower edge of the trunk door at the vehicle body;
    a ring bead that is formed at the inner panel protruding inward toward the luggage compartment and forms a circuit round an outer periphery of the inner panel;
    a longitudinal bead that is formed at the inner panel protruding inward toward the luggage compartment and extends in the vehicle front-and-rear direction at a vehicle width direction middle portion, each of two end portions of the longitudinal bead connecting to the ring bead; and
    a lateral bead that is provided along a ridgeline region between the upper wall portion and the rear wall portion protruding inward toward the luggage compartment, the lateral bead extending from the longitudinal bead toward each vehicle width direction outer side, and each vehicle width direction outer side end portion of the lateral bead being disposed at a position that is spaced a distance from the ring bead by a flat portion of the inner panel disposed between the ring bead and each vehicle width direction outer side end portion of the lateral bead.

2. The vehicle trunk door structure according to claim 1, wherein the lateral bead and a portion of the ring bead other than a portion that intersects with a line of extension of the lateral bead are connected by an auxiliary bead.

3. The vehicle trunk door structure according to claim 2, wherein
an end portion of the auxiliary bead at the ring bead side thereof is connected to a corner portion that is formed by a vehicle rearward lower edge portion and a vehicle width direction longitudinal edge portion of the ring bead.

4. The vehicle trunk door structure according to claim 2, wherein
an end portion of the auxiliary bead at the ring bead side thereof is connected to a vehicle rearward lower edge portion of the ring bead, and the auxiliary bead is formed to be perpendicular to the vehicle rearward lower edge portion of the ring bead.

* * * * *